United States Patent [19]
Koch

[11] 4,396,208
[45] Aug. 2, 1983

[54] TRAILER

[76] Inventor: Kevin E. Koch, 47 Kinkaid Ave., North Plympton, State of South Austrailia, Australia

[21] Appl. No.: 252,367

[22] Filed: Apr. 9, 1981

[30] Foreign Application Priority Data

Sep. 11, 1980 [AU] Australia ............................... PE5531

[51] Int. Cl.³ ............................................. B62D 63/06
[52] U.S. Cl. .................................... 280/789; 296/31 P
[58] Field of Search ............... 280/789, 63; 296/31 P, 296/26, 181, 182

[56] References Cited

U.S. PATENT DOCUMENTS

| 3,387,853 | 6/1968 | Sueoka | 280/789 |
| 3,549,165 | 12/1970 | Zuhlke | 296/31 P |
| 3,784,230 | 1/1974 | Worrall | 280/789 |
| 4,305,602 | 12/1981 | Ungvari | 280/789 |

Primary Examiner—Joseph F. Peters, Jr.
Assistant Examiner—John A. Carroll
Attorney, Agent, or Firm—Charles A. Blank

[57] ABSTRACT

A trailer which has a rectangular frame formed by some of its chassis members and a body which comprises a moulding assembly having a base portion and an upper portion, the base portion having a register which engages the rectangular frame and the upper portion having a peripheral zone which engages the periphery of the base portion.

6 Claims, 4 Drawing Figures

TRAILER

This invention relates to a trailer and has as its main object the provision of a trailer which will be of pleasing appearance, light weight, and of low cost, yet nevertheless possessing sufficient mechanical strength characteristics to be useful for a wide range of purposes.

BACKGROUND OF THE INVENTION

Trailers are subjected to such heavy loading on occasions that in most instances trailers are heavily constructed and are expensive. Most trailers are constructed to have a flat or nearly flat base which can be regarded as an horizontal base, surrounded by vertical walls, and the base and walls are reinforced to give mechanical strength which will withstand the various forces imposed. These forces include the dead weight forces of loading on the trailer floor, the live weight forces due to the "bounce" of such loading, the side thrust due to the use of trailers occasionally with a flowable load such as grain, gravel, sand or the like, and other dynamic forces which are encountered when the trailer negotiates deviations from direction in the vertical or horizontal plane. There are also dynamic inertia forces in a fore and aft direction.

It has long been recognized that certain plastics materials may be moulded advantageously to provide a low cost product, but heretofore mouldings have not been used extensively in trailers because of the mechanical forces which are imposed. It has been believed that mouldings are too weak to withstand these forces, unless the mouldings are made of material of such thickness as to be excessively expensive.

BRIEF SUMMARY OF THE INVENTION

In this invention a trailer has a rectangular frame formed by some of its chassis members, a moulding assembly comprising a base portion and an upper portion, the base portion having a register which engages the frame, and the upper portion having a peripheral zone which engages the periphery of the base portion.

More specifically, in this invention a trailer comprises a chassis having chassis members which define a rectangular frame, and a moulding assembly having a base portion and an upper portion, the base portion having horizontal and vertical walls defining a peripheral register engaged by said chassis members of the rectangular frame, the base portion further having both upwardly extending portions and outwardly extending portions which provide strength in vertical and horizontal planes, and which terminate in a peripheral flange, the upper portion having an outer peripheral zone which engages the peripheral flange of the base portion, an upper web and an inner peripheral lip, and means joining said outer peripheral zone and said base portion peripheral flange.

With this invention the base portion is supported inwardly of its periphery by the chassis so that the loading on the base portion is supported at a very advantageous location, and also the base portion is stiffened both by the rectangular frame and the shapes of the portions, both vertically and laterally, so that it will withstand the dynamic forces referred to above. Notwithstanding such stiffening, the flexible nature of a thin moulding is such that it can deflect, but by having the peripheral zone of the upper portion interengaging the periphery of the lower portion, a double strength is imparted at the location of what is otherwise the open top of the base portion. This provides means for resisting the bursting and inertia forces in a lateral direction, the upper portion not merely increasing the capacity of the trailer, but also providing a peripheral strength.

If trailers are to be produced inexpensively, marketing requirements include the need for the trailer to occupy a relatively small packaging space for transport purposes, and in an embodiment of this invention the shape and size of the upper portion is such that it can contain the lower portion (or vice versa) in a package which occupies relatively small space.

Many trailers have appended thereto mud guards (fenders) which are secured to the outer faces of side walls of the trailer, and located above the wheels. However, in an embodiment of this invention the mud guard configuration is incorporated in the base portion, and the side skirt of the mud guard is embodied in the upper portion, thereby avoiding the need for further appendages and at the same time enabling the wheels to be relatively close together, that is, avoiding outward projection of the wheels from the trailer body.

An embodiment of the invention is described hereunder in some detail with reference to, and is illustrated in, the accompanying drawings, in which.

Figure 1:
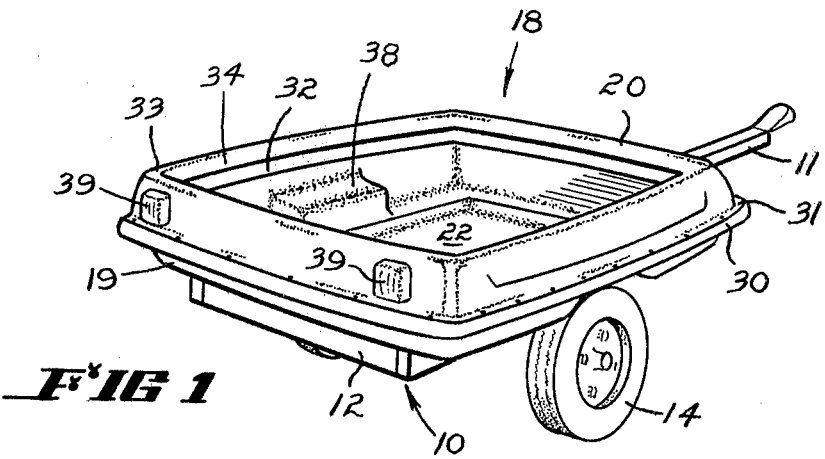
FIG. 1 is a rear perspective view of a trailer.
Figure 2:
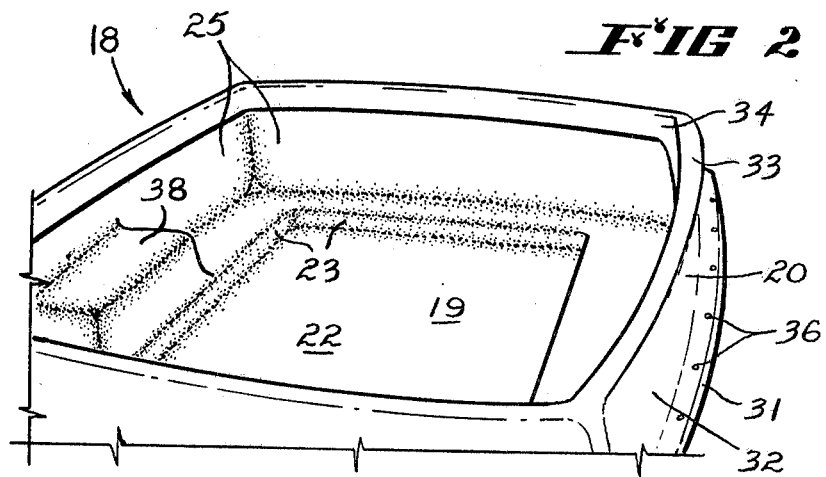
FIG. 2 is a fragmentary perspective view which illustrates the interior of the trailer, and drawn to an enlarged scale.
Figure 3:
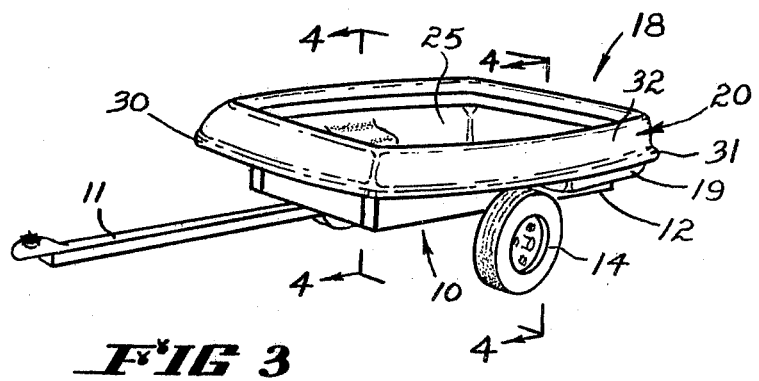
FIG. 3 is a front perspective view.

In this embodiment a chassis 10 is formed from rectangular tubing, having a draw bar 11 secured thereto to project from the front end of an open rectangular frame 12 formed by longitudinal and transverse chassis members. The rectangular frame 12 is itself provided with a transversely extending chassis member 13 intermediate its ends, and this supports the wheels 14 through wheel arms 15, there being resilient mounting means (not shown) between the wheel arms 15 and the chassis member 13.

Figure 4:
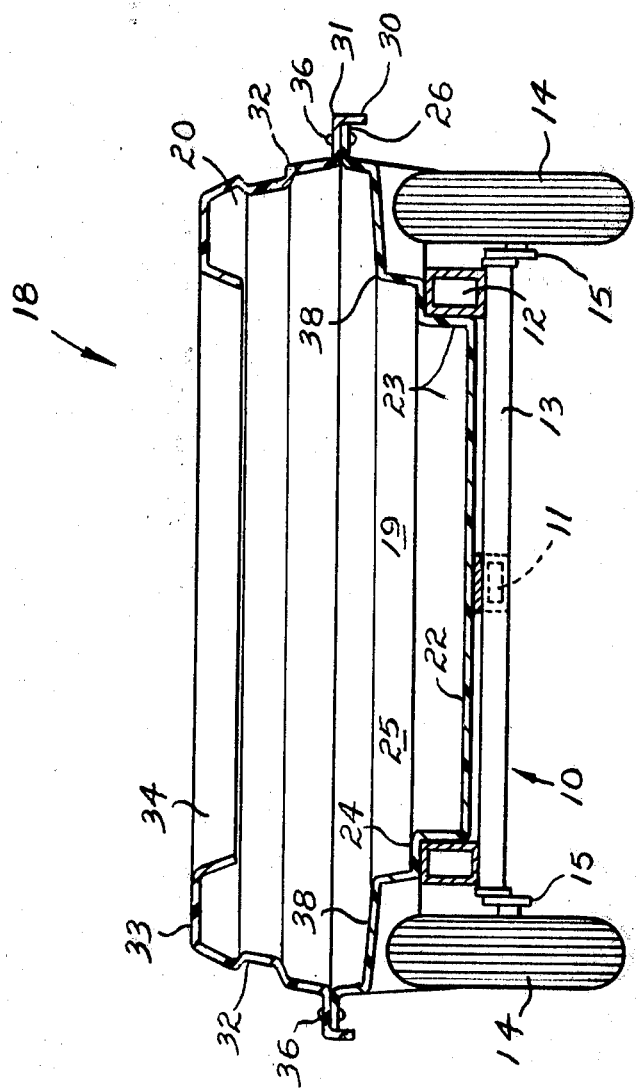
FIG. 4 is a section taken on plane 4—4—4—4 of FIG. 3.

A trailer body 18 comprises two portions, one being a base portion 19, and the other an upper portion 20. The base portion 19 is formed by a process of moulding a heat deformable polymeric sheet, and for example in this embodiment the process of moulding is a vacuum forming process. The base portion is moulded to a shape which comprises a central floor 22 surrounded by first vertical walls 23 which extend upwardly a short distance, and then outwardly extending horizontal walls 24, which, with the walls 23 define a register which engages the rectangular chassis frame 12. The horizontal walls 24 merge into upwardly extending side walls 25 and each side wall merges into an outstanding peripheral flange 26 (FIG. 4). This can be interrupted at the rear end by a tail gate.

The floor 22 of the base portion 19 lies totally within the rectangular frame 12 of the chassis, but is also partially supported intermediate its ends by the chassis cross member 13 to which the draw bar 11 is secured, and by the draw bar itself, as shown in FIG. 4.

The interengagement of the base portion 19 and rectangular frame 12 provides considerable strength, but the side walls 25 and outwardly extending flange 26 provide still further strength in both the vertical and the lateral planes at the periphery of the base portion.

However, if use is made of plastics material formed by the drape moulding or vacuum forming process, it is still possible for deflection to take place along the sides for example of the base portion due to the lateral forces which can be imposed, combined with the weight imposed upon the second outwardly extending portion. The upper portion 20 functions to restrain this deflection, and the peripheral zone of the upper portion 20 is provided with a depending skirt 30 surrounding its lower end, this merging into a horizontal web 31 which extends inwardly and lies contiguous with the upper surface of the outstanding peripheral flange 26 of the base portion 19. This web 31 merges along its inner edge into upwardly extending side walls 32 of the upper portion, the side walls 32 sloping upwardly and inwardly having a stiffening formation intermediate its upper and lower edges, and the upper edge of the wall 32 sweeps inwardly into a horizontal upper portion 33 which in turn terminates in an inwardly and downwardly sloping lip 34 which defines the charging opening for the trailer.

A tail gate may be provided having a similar configuration to the configuration described above, and hinge means to couple the tail gate to the base portion.

The base and upper portions are retained together, either by rivets 36 (FIG. 4) or screw fasteners (for permanent assembly) or by means of clamps which can for example have their elements secured respectively to the base and upper portions, and within the trailer space.

In this embodiment the size and shape of the upper portion is slightly greater than that of the lower portion so that the lower portion can nest in the upper portion for transport purposes.

The base portion has a pair of formations moulded therein which each constitutes a wheel house 38, and the wheel houses are located above respective wheels 14. The lower edge of the depending skirt 30 of the peripheral zone of the upper portion is a continuous straight line and this provides an attractive appearance skirt which partially obscures the trailer wheels.

In addition to having recesses for the wheel housings, there are also provided recesses in the rear wall of the upper portion for housing lights 39 which reduce the likelihood of damage thereto.

A brief consideration of the above embodiment will indicate that the invention provides a very simple trailer which can be transported in CKD form and assembled for example by a purchaser. The weight of the trailer can be much less than previously constructed trailers, and the cost can also be very much less than trailers having similar capacity.

I claim:

1. A trailer comprising a chassis having longitudinal and transverse chassis members defining an open rectangular frame, a moulding assembly having a base portion and an upper portion, and wheels, the base portion having a floor surrounded by vertical walls which merge into horizontal walls to define a register engaged and supported by all the chassis members of the rectangular frame, the base portion having further portions which extend upwardly from the horizontal walls and merge at their upper ends into an outwardly extending peripheral flange and which provide strength in vertical and horizontal planes both at the periphery of the floor and at the periphery of the base portion, the upper portion having an outer peripheral zone which engages the peripheral flange of the base portion, an upper portion and an inner peripheral lip, and means joining said outer peripheral zone and said base portion peripheral flange.

2. A trailer according to claim 1 wherein said chassis comprises a transverse member secured at its ends to the underside of said peripheral frame, a draw bar extending forwardly from said transverse member and also secured to the underside of said peripheral frame, said transverse member and draw bar further supporting said floor.

3. A trailer according to claim 2 comprising wheel arms carrying respective wheels, and resilient mounting means between respective said wheel arms and said transverse member.

4. A trailer according to claim 1 wherein said upper portion peripheral zone web comprises a web which lies in face to face contiguity with said base portion peripheral flange, and a skirt which surrounds and depends from said web.

5. A trailer according to claim 4 wherein said upper portion comprises walls extending upwardly from said web, merging into an upper portion which extends inwardly, and downwardly from the upper portion in said inner peripheral lip which defines a charging opening for the trailer.

6. A trailer according to claim 1 wherein both said base and upper portions are formed from polymeric sheet material by a vacuum forming process.

* * * * *